US010101829B2

(12) United States Patent
Jagtman

(10) Patent No.: US 10,101,829 B2
(45) Date of Patent: Oct. 16, 2018

(54) BRAILLE DISPLAY SYSTEM

(71) Applicant: Optelec Holding B.V., Barendrecht (NL)

(72) Inventor: Sofieke Jagtman, Delft (NL)

(73) Assignee: Optelec Holding B.V., Barendrecht (NL)

( * ) Notice: Subject to any disclaimer, the term of this patent is extended or adjusted under 35 U.S.C. 154(b) by 0 days.

(21) Appl. No.: 14/301,452

(22) Filed: Jun. 11, 2014

(65) Prior Publication Data
US 2015/0363015 A1   Dec. 17, 2015

(51) Int. Cl.
*G06F 3/041* (2006.01)
*G06F 3/02* (2006.01)
*G06F 3/01* (2006.01)
*G06F 1/16* (2006.01)
*G09B 21/00* (2006.01)
*G09B 21/02* (2006.01)

(52) U.S. Cl.
CPC ............ *G06F 3/041* (2013.01); *G06F 1/1632* (2013.01); *G06F 3/017* (2013.01); *G06F 3/0219* (2013.01); *G09B 21/001* (2013.01); *G09B 21/003* (2013.01); *G09B 21/02* (2013.01); *G06F 2203/04101* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

| 5,714,978 A * | 2/1998 | Yamanaka | G06F 3/016 345/157 |
| 6,259,006 B1 | 7/2001 | Parienti | |
| 6,317,061 B1 * | 11/2001 | Batra | G06F 3/0202 341/20 |
| 6,869,239 B2 * | 3/2005 | Morris | G06F 1/1615 341/22 |
| 8,690,576 B2 | 4/2014 | Murphy et al. | |
| 2009/0250515 A1 * | 10/2009 | Todd | A47F 9/046 235/383 |
| 2010/0238114 A1 * | 9/2010 | Vartanian | G06F 3/0416 345/168 |
| 2011/0181444 A1 | 7/2011 | Mauduit et al. | |

(Continued)

FOREIGN PATENT DOCUMENTS

| EP | 2018030 | 1/2009 |
| WO | 2009128700 | 10/2009 |
| WO | 2013135299 | 9/2013 |

OTHER PUBLICATIONS

Kothandaraman, Harish "Braille Touch Tablet" https://www.youtube.com/watch?v=vUhR6VFI3i8, Oct. 10, 2011.*
Yanko ("The Ultimate Braille Phone", Yanko Design, Feb. 20, 2012, http://www.yankodesign.com/2012/02/20/the-ultimate-braille-phone/ as well as http://v.youku.com/v_show/id_XMjk2MTk4MDMy.html incorporated video;Radhika Seth, hereinafter referred to as "Yanko").*

(Continued)

*Primary Examiner* — Matthew Yeung
(74) *Attorney, Agent, or Firm* — N.V. Nederlandsch Octrooibureau; Catherine S. Shultz; Lindsey A. Auerbach

(57) ABSTRACT

A Braille display system can include a plurality of Braille cells; and a touch sensitive surface for providing input to the system. The Braille display system can include a plurality of modular portions, with each portion including a plurality of Braille cells. A Braille display system can include a docking station to receive one or more modules with a plurality of Braille cells.

27 Claims, 8 Drawing Sheets

(56) References Cited

U.S. PATENT DOCUMENTS

| | | | | |
|---|---|---|---|---|
| 2011/0216006 | A1* | 9/2011 | Litschel | G06F 3/016 |
| | | | | 345/168 |
| 2012/0214139 | A1* | 8/2012 | Murphy | G09B 21/004 |
| | | | | 434/114 |
| 2013/0166808 | A1* | 6/2013 | Yu | G06F 1/1632 |
| | | | | 710/303 |
| 2013/0202339 | A1* | 8/2013 | Knighton | G06F 3/0202 |
| | | | | 400/489 |
| 2013/0249821 | A1 | 9/2013 | Dharmaraja et al. | |
| 2013/0275907 | A1 | 10/2013 | Lau et al. | |
| 2014/0089543 | A1* | 3/2014 | Creager | G06F 13/4081 |
| | | | | 710/110 |
| 2016/0034180 | A1* | 2/2016 | Labbe | G06F 3/04886 |
| | | | | 345/173 |

OTHER PUBLICATIONS

Extended European Search Report for related European Application No. 15171383.1 dated Nov. 2, 2015 (8 pages).

Jagtman, S. "A new touch in Braille display design: The design of a next generation Braille display", TU Delft Institutional Repository, Aug. 28, 2013. Retrieved from the Internet on Oct. 20, 2015, URL:<http://repository.tudelft.nl/view/ir/uuid%3Abf0a67e1-c74a-4291-917f-c686f7501a9b> (3 pages).

Anonymous: "Braille displays", Jan. 6, 2007 (Jan. 6, 2007), XP055437562,Retrieved from the Internet: URL:http://www.magnifyingcenter.com/TempNeeded/braille_displays.htm [retrieved on Dec. 22, 2017].

Office Action EPO, 'Communication pursuant to Article 94(3) EPC', dated Jan. 16, 2018.

* cited by examiner

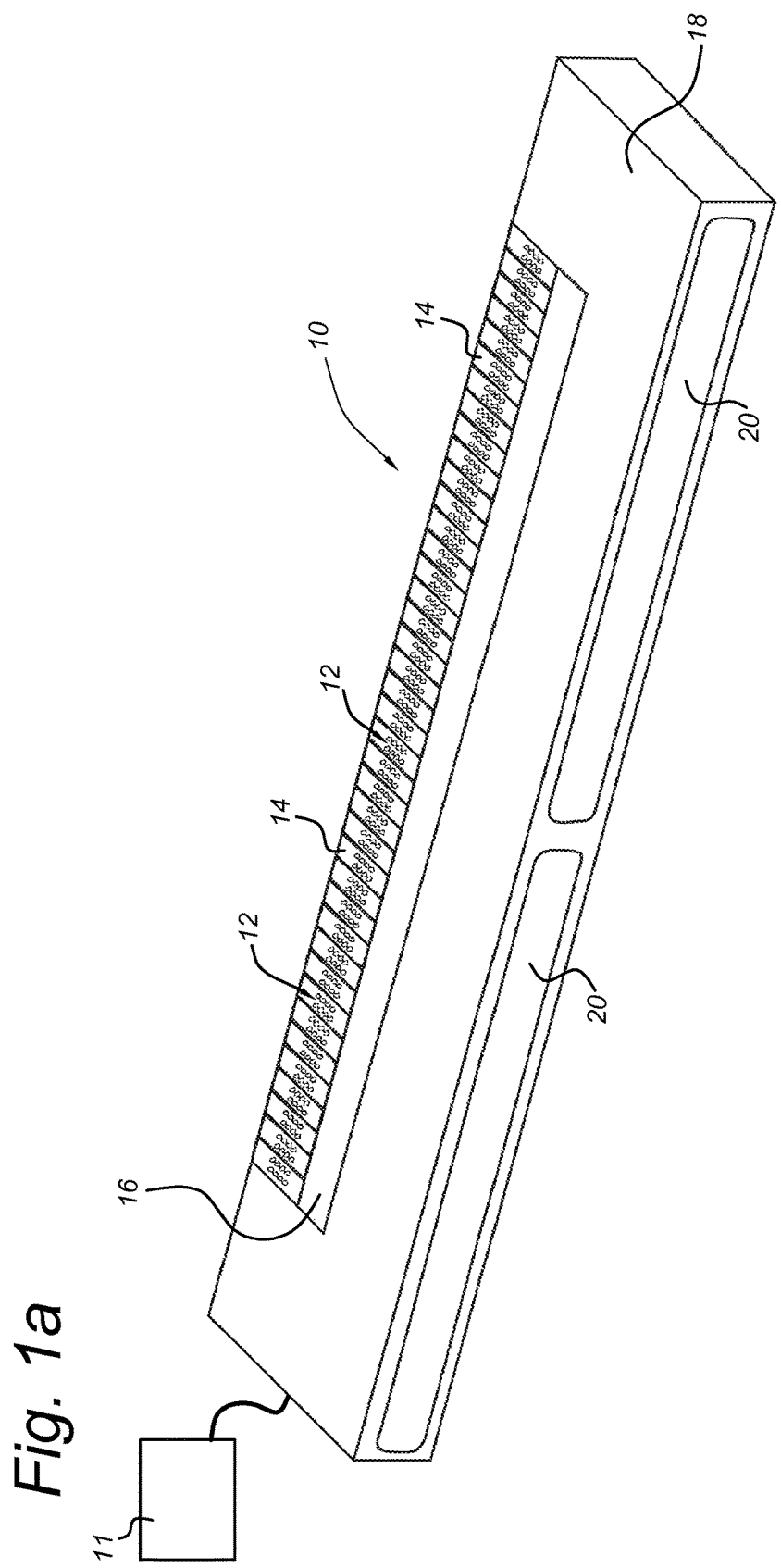

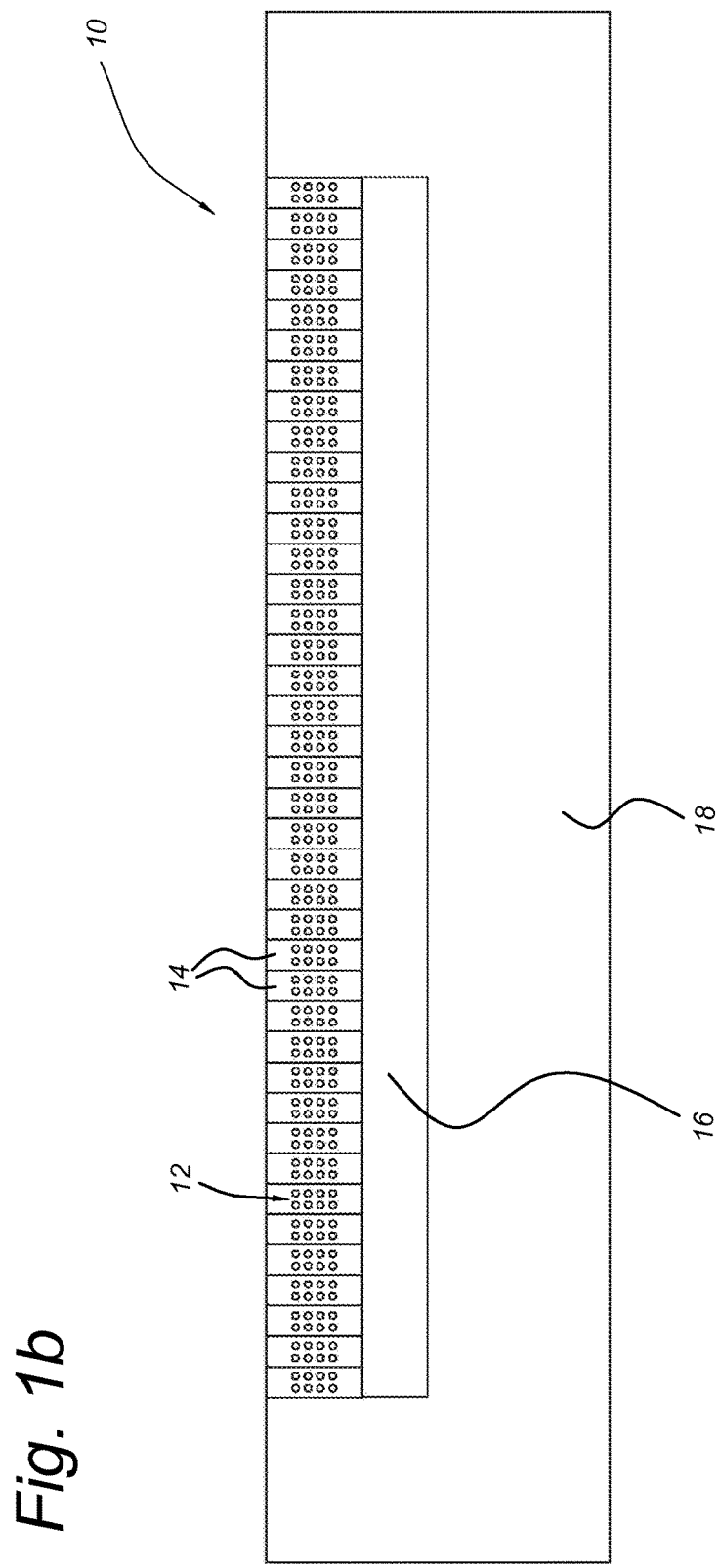

BRAILLE DISPLAY SYSTEM

BACKGROUND

This invention relates to an apparatus to assist persons with impaired or no eyesight in reading electronic information using Braille. Typically Braille displays include Braille cells which display characters using dots. A six dot system is generally used for the display of standard letter characters, but Braille characters can include eight dots to enable the display of the various symbols as well.

The Braille display can be connected to an electronic device, such as a computer, tablet or mobile telephone to display information from that device. A typical Braille display includes 12, 20, 40 or 80 cells, allowing for the display of anywhere between 12 and 80 characters at one time. After those characters have been read by the user, the user can press navigation buttons to display the next set of characters on the device, moving from side to side and/or from one line to the next. The navigation buttons are typically as close as possible to the Braille cells, or on the front side of the device. Additional buttons can include cursor routing buttons and short-cut keys, which are located below, above or surrounding the Braille cells.

SUMMARY

According to a first aspect of the invention, a Braille display system includes a plurality of Braille cells; and a touch sensitive surface for providing input to the system.

Additional and/or alternative embodiments may include the touch sensitive surface being a touch panel; the touch sensitive surface being a multi-touch touch panel; the touch panel being paired with a processor, and the touch panel/processor pair being programmed for input finger detection; the touch panel/processor pair being programmed for receiving hand gesture input; the touch sensitive surface serving as a Braille keyboard; the Braille keyboard being a 6-dot Braille keyboard; the Braille keyboard being an 8-dot Braille keyboard; the integrated Braille display system comprising a top surface with a proximal user portion and a distal user portion, with the Braille cells being substantially located in the distal user portion; the touch sensitive surface being substantially located in the proximal user portion; at least one touch thumb panel located on a front surface of the integrated Braille display system; and/or the plurality of Braille cells comprising from 10 to 30, from 30 to 50, or from 50 to 100 Braille cells.

According to a second aspect of the invention, an integrated Braille display system can include a first modular portion; and a second modular portion. The first modular portion and the second modular portion may be connected for use together or separated for use as only a single modular portion.

Additional and/or alternative embodiments may include each of the first and the second modular portions comprising a plurality of Braille cells and a touch sensitive surface; the first modular portion and the second modular portion able to be connected wirelessly to communicate with each other; the first modular portion and the second modular portion able to be connected by establishing an electrical connection between the modular portions; the electrical connection being established by connecting the first modular portion and the second modular portion to a docking station; guiding means to guide in aligning the first modular portion and/or the second modular portion with the docking station; guiding means to guide aligning of the first modular portion with the second modular portion; the guiding means being one or more magnets, alignment pins, guiding rails and/or other guiding geometry; the first modular portion and the second modular portion being able to be clipped together; and/or the first modular portion and the second modular portion cooperating in a master/slave hierarchy.

According to a third aspect of the invention, a Braille display system includes at least one module with a plurality of Braille cells; and a docking station for securing the at least one module.

Additional and/or alternative embodiments include the docking station comprising guiding means to guide aligning of the at least one module with the docking station; the guiding means securing the at least one module to the docking station; locking means to secure the at least one module to the docking station; at least one touch sensitive surface for providing input into the system; at least one navigational key for providing input into the system; an electrical connection being established by connecting the at least one module with the docking station; and/or the docking station providing power to the at least one module.

BRIEF DESCRIPTION OF THE DRAWINGS

FIG. 1a shows a perspective view of a Braille display system.

FIG. 1b shows a top view of the Braille display system of FIG. 1a.

DETAILED DESCRIPTION

Figure 1C:
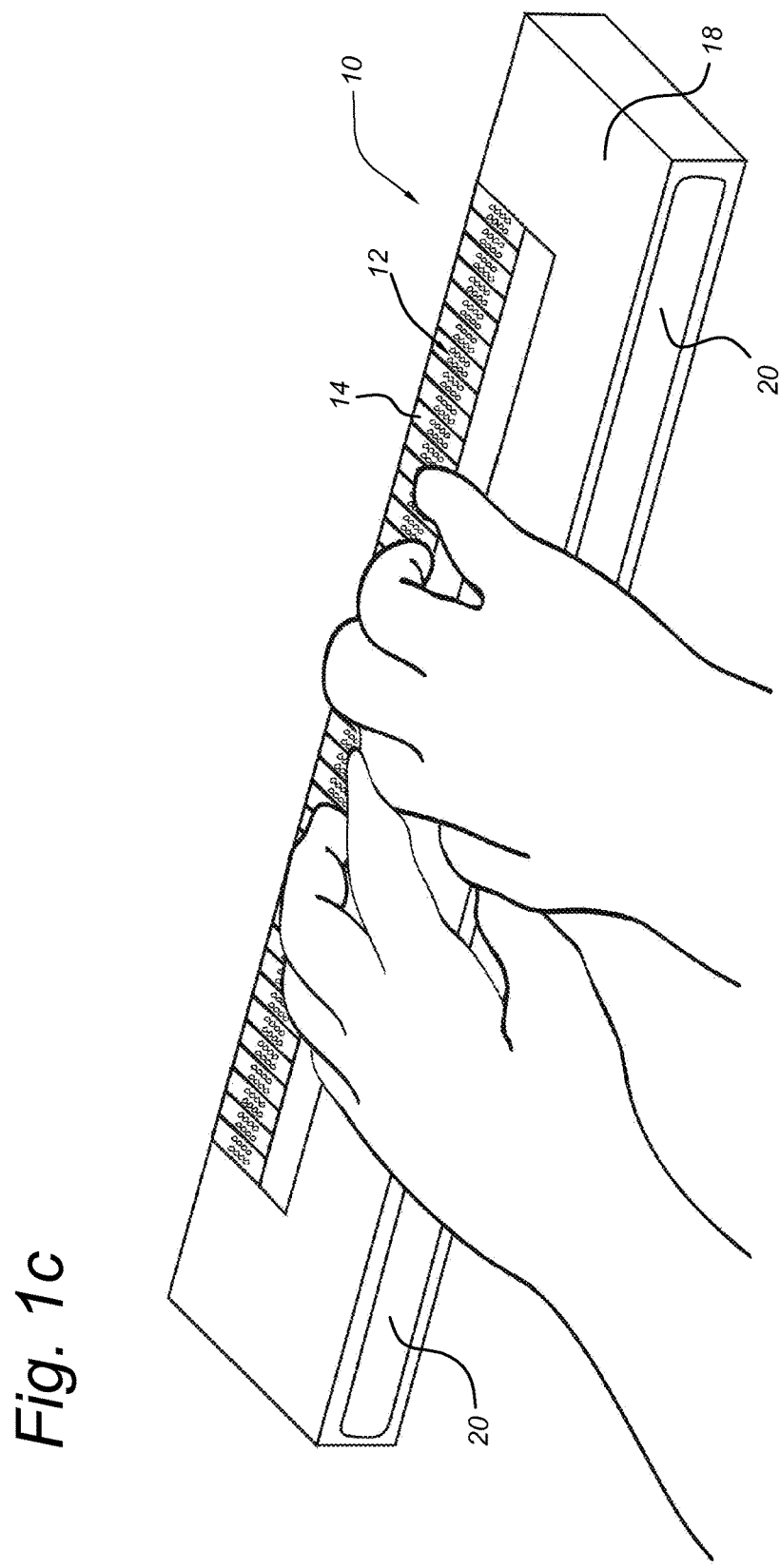
FIG. 1c shows a perspective view of the Braille display system of FIG. 1a with hands positioned for reading Braille characters.
Figure 1D:
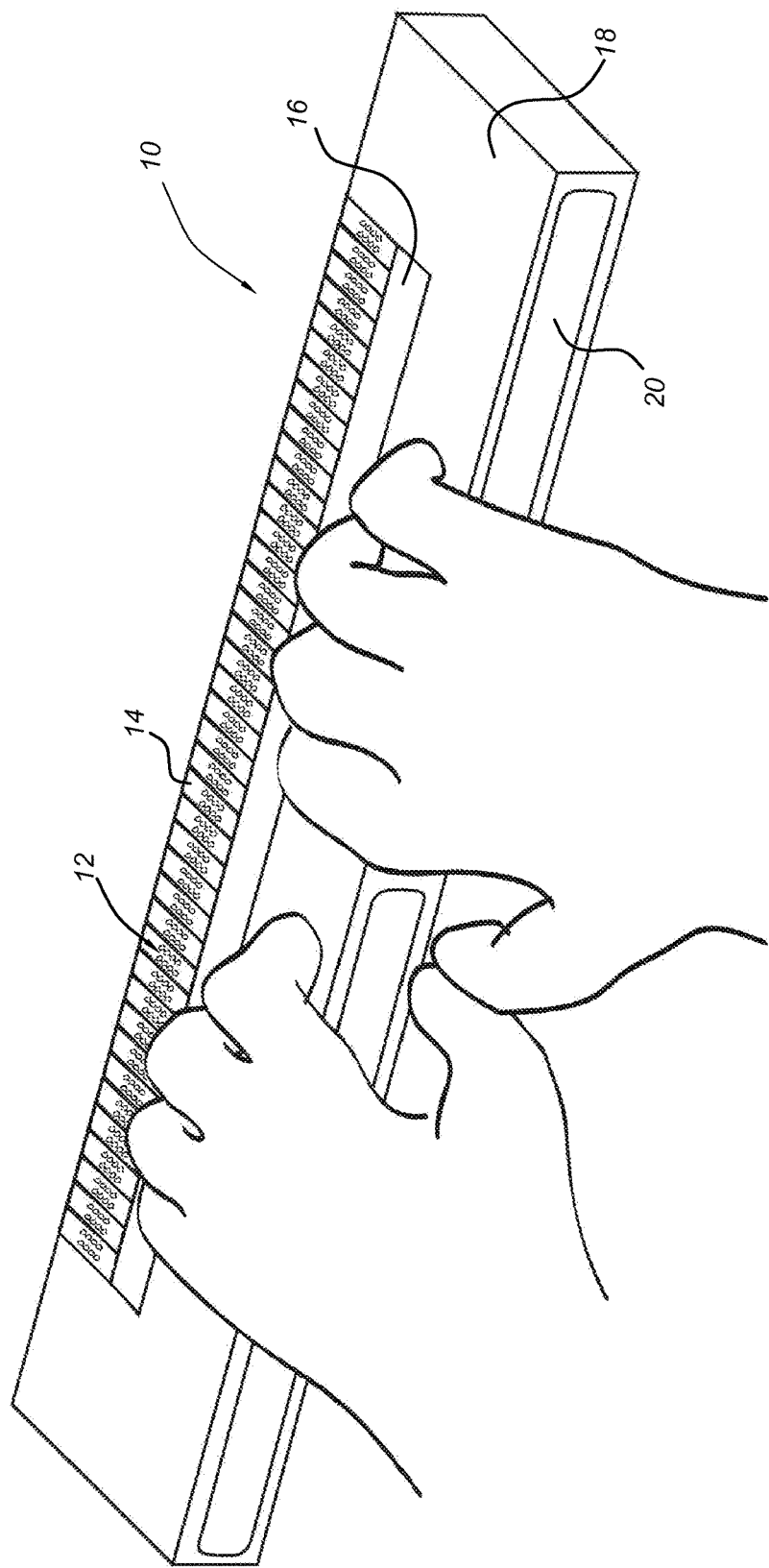
FIG. 1d shows a perspective view of the Braille display system of FIG. 1a with hands positioned for typing.

FIG. 1a shows a perspective view of Braille display system 10 connected to electronic device 11, FIG. 1b shows a top view of Braille display system 10, FIG. 1c shows a perspective view of the Braille display system 10 with hands positioned for reading Braille characters, and FIG. 1d shows a perspective view of the Braille display system 10 with hand positioned for typing. Braille display system 10 includes Braille cells 12, Braille cell caps 14, cursor routing touchstrip 16, touch panel 18 and touch thumb panels 20. While Braille cells 12 include a portion not visible which extends from the visible portion within Braille display system 10, the use of the term "Braille cell 12" will also be used to refer to the visible portion for reading characters, namely the dots or pins (and Braille cell cap(s) 14).

Braille display system 10 operates to display information from electronic device 11 through Braille cells 12. In FIG. 1a, Braille display system 10 is connected to electronic device 11 through a wire connection, for example a USB connection, though in other embodiments the connection can be wireless, such as through Bluetooth or wifi. Electronic device 11 can be a screen based device which displays information, for example, a computer, a tablet or a mobile telephone. Braille display system 10 is powered by batteries stored inside reading device 10. In other embodiments, Braille display system 10 can be powered by an electrical connection, for example a plug-in to a wall outlet or a USB connection.

The embodiment of Braille display system shown includes 40 Braille cells 12 with 40 Braille cell caps 14, allowing for a 40 character display window from electronic device 11. Braille cells 12 in this embodiment each consist of 8 dots or pins, though in other embodiments Braille cells 12 could consist of only 6 dots or pins. In the embodiment shown, the portion of Braille cells 12 displaying information are on a top portion or distal user portion of Braille display system 10 with touch panel 18 being on a bottom or proximal user portion. In other embodiments, the portion of Braille cells 12 displaying information could be on the bottom portion with touch panel 18 being located on a top or distal portion of Braille display system 10.

Cursor routing touchstrip 16 is located directly adjacent to the portion of Braille cells 12 displaying information through pins, and in this embodiment is directly below the portion of Braille cells 12 displaying information through pins. Cursor routing touchstrip 16 is used for routing the cursor when reading characters on Braille cells 12. The cursor is moved to a particular location on a display of the electronic device by touching or making a certain gesture on cursor routing touchstrip 16 nearest to the place where the corresponding Braille character is displayed by one of Braille cells 12. Cursor routing touchstrip 16 can have a different texture or tactile feel than touch panel 18 so that it is easy to discern. In some embodiments, cursor routing touchstrip 16 can be totally separated from touch panel 18.

Touch panel 18 is located on the top surface of Braille display system 10, and has a touch sensitive surface area for the user to interact with and provide input to the system when using Braille display system 10. Some or all of touch panel 18 can be covered by some form of glass, plastic, or any other suitable material. Touch thumb panels 20 are located on a front surface of Braille display system 10. Touch panel 18, cursor routing touchstrip 16 and/or touch thumb panels 20 can be a multi-touch touch panel, meaning that the surface can recognize more than one point of contact simultaneously.

Touch panel 18 and touch thumb panels 20 can be paired with a processor programmed for input finger detection and to receive touch or finger gesture inputs. These gestures can vary, and can be, for example, tapping, swiping or other gestures which act as commands for Braille display system 10. The commands relate to various instructions, such as moving the area on electronic device 11 that is displayed by the Braille cells 12. For example, a swipe to the right could move the electronic device 11 area displayed to the next set of characters; a tap on one of the touch thumb panels 20 could move the electronic device 11 area displayed down a line; or any other combination of touch-related gestures could relate to a number of other commands and/or movements.

Touch panel 18 can also function as a keyboard for typing characters, as shown in FIG. 1*d*. This can be initiated by holding fingers on touch panel 18 for a period of time, for example 2 seconds, during which time touch panel 18 calibrates a Braille keyboard according to the user's finger placement. The user can then type characters on this keyboard, which can be transmitted to electronic device 11. These characters typed can also be read back through Braille cells 12 for review and/or accuracy. In some embodiments, Braille display system 10 can store a certain amount of characters which are typed in for a period of time if not connected to electronic device 11 when the characters are input. In some embodiments, the characters could then be transferred to electronic device 11 when Braille display system is connected to electronic device 11 and/or synched with electronic device 11 at a later time.

In operation, Braille cells 12 can display 40 characters at a time from electronic device 11. Information from electronic device 11 can be transmitted to Braille display system 10 through a wired connection, such as a USB cable, or wirelessly, for example, through a Bluetooth or wi-fi connection. A user can then read those 40 cells, and when finished, he or she can use a predetermined gesture on touch panel 18 and/or thumb touch panels 20 to command the system 10 to display a new area of electronic device 11 with the Braille cells 12. If the user desires to send information back to the electronic device 11, for example, the user wishes to add a sentence or fix a typo in an electronic document being displayed, or to type a response text if electronic device 11 is a mobile phone, the user can simply choose the location he or she desires to start typing by making a gesture on the cursor routing touchstrip 16 closest to the Braille cell 12 displaying the position he or she would like to begin inserting characters. The user may then move his or her hands directly below the portion of Braille cells 12 being read to the touch panel 18 and calibrate a keyboard as described above. The user may then type characters on this keyboard, which will be displayed with the corresponding electronic characters on the electronic device 11. Once the user has finished typing, he or she can review what has been typed by moving the display window on the electronic device 11 using gestures on the touch panel 18 and/or the touch thumb panels 20 so that the Braille cells 12 display the desired content.

By replacing the buttons or keys of prior art Braille display systems with touch sensitive surfaces 16, 18, 20 for providing input to the system, Braille display system 10 is a more flexible, efficient and ergonomic system. Compared to prior art systems, there is less movement required when moving the display window as the user no longer needs to reach for coordination and navigation buttons in specific set locations of prior art Braille display systems. With the large touch panel 18, a gesture can be made to move display window to display new characters wherever the user's hands happen to be. For example, in prior art Braille display systems, if a user finishes reading the characters displayed in the middle of a line, as the navigation keys are typically at the beginning and end of the Braille cells, he or she must move at least one hand to the beginning or end of the cells to navigation keys for moving the display window to display the next desired characters. In Braille display system 10, when the user finished reading characters in the middle of the Braille cells 12, he or she can simply make a designated gesture on touch panel 18 or thumb panels 20 in an area nearest to where his or her hands are currently located (in the middle of the display) to move the display window.

This ability to input gestures anywhere on touch panel 18 also results in a user's being able to read electronic device 11 information faster. As the number of characters that can be displayed on a Braille display system is typically quite limited compared to the number of characters in a standard electronic document, the display window must be moved often to read through an entire document. Thus, by making the moving of the display window on the electronic device 11 easier through being able to simply make a touch input anywhere on touch panel 18 and/or touch thumb panels 20, the user can more quickly move the display window so that new characters are displayed by the Braille cells 12 without wasting time searching for buttons. This also decreases the propensity for error and the distraction associated with having to move a distance and search for the right buttons every time the set number of characters have been read.

Additionally, touch panel 18 allows for an overall smaller device when desired. As the different commands can be associated with different gestures in Braille display system 10 instead of different buttons with different physical locations (as in past Braille display systems), not as much space is required to be able to perform the needed gestures and commands. The various gestures can be made anywhere on touch panel 18, and different gestures or commands can be made in the same physical location on touch panel 18.

The ability to calibrate and use touch panel 18 as a keyboard also can save time when typing and provides a more ergonomic keyboard. Past Braille keyboards typically had six or eight buttons in a fixed location which were used to input Braille characters. By being able to calibrate your own keyboard on touch panel 18, a user is not constrained to position his or her hands in the exact setup of the fixed location keys. The user can position his or her hands and calibrate the keyboard in a location and position that feels most comfortable to the user. For example, a user with large hands could calibrate a larger keyboard than one typically used, and would not have to adhere to a fixed button Braille keyboard that would cramp the user's hands. Additionally, a user can easily type near where his or her hands were already positioned for reading for a quicker character input.

By using touch panel 18 instead of buttons or keys of past systems, Braille display system 10 can also be quieter than past systems, allowing for use in environments where noise is not desired such as meetings or lectures. Keys or buttons typically make some sort of noise when pressed, and can lead to distractions in quiet environments. Touch panel 18 allows for movement of display window and/or typing in Braille display system 10 without the noises of keys or buttons of past systems. Alternatively, the system can be used to provide audible feedback to typing input (for example, simulated key sounds) when such feedback is desired.

Figure 2:
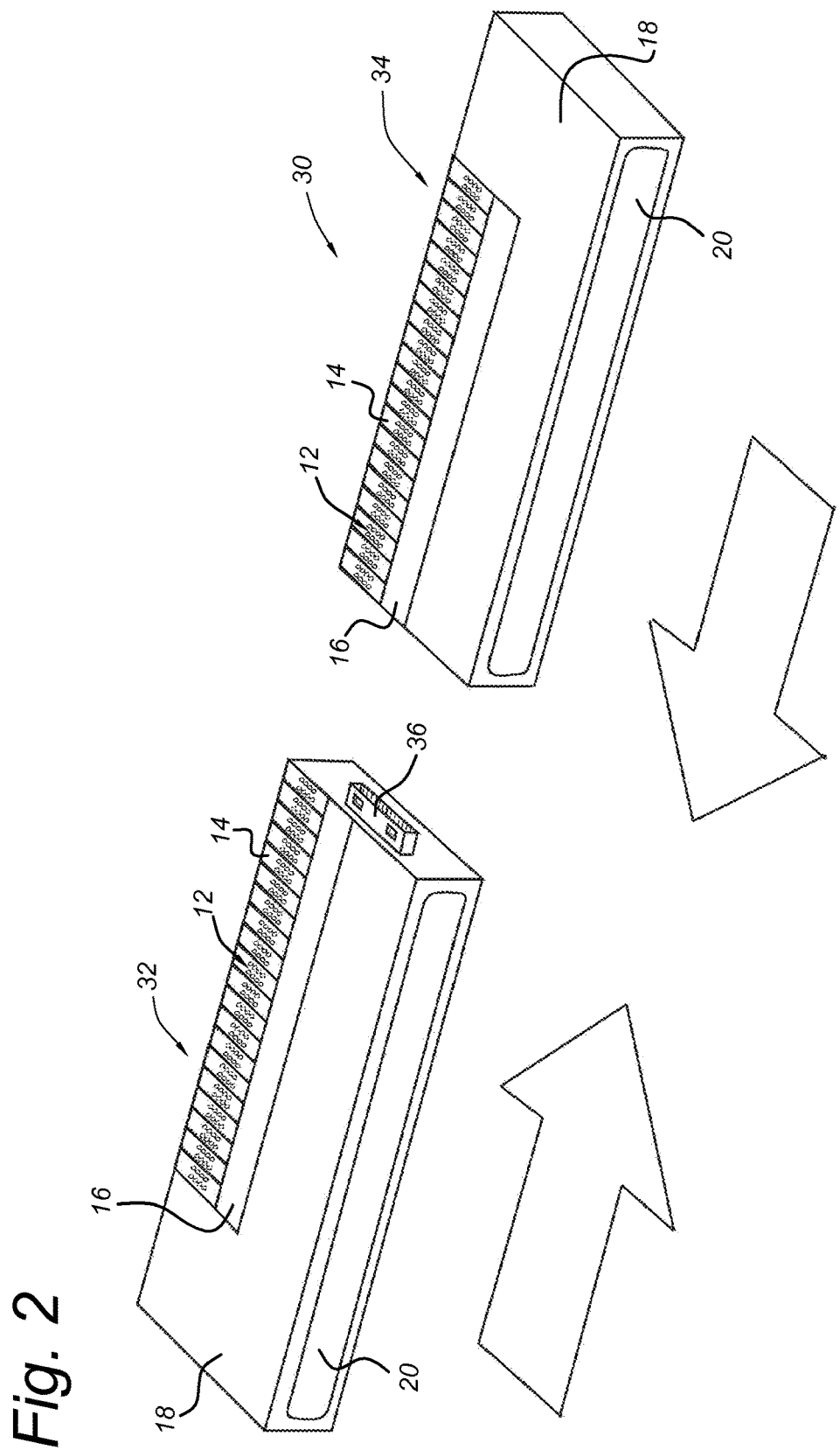
FIG. 2 shows a perspective view of a modular Braille display system.

FIG. 2 shows a perspective view of modular Braille display system 30. Similar parts are labeled similarly to Braille display system 10 in FIGS. 1a-1d. Braille display system 30 includes first modular portion 32, second modular portion 34 and connection device 36. Each of modular portion 32, 34 include Braille cells 12 with Braille cell caps 14, touch panel 18 and thumb touch panel 20.

Connection device 36 can be a connection device with a male connection component as shown on modular portion 32 and a female receiving connection device component (not shown) on the other modular portion 34. In other embodiments, connection between modular portion 32 and modular portion 34 can be established by other means, for example a wireless connection.

Each of modular portions 32, 34 can function individually as described above in relation to FIGS. 1a-1d. That is, each can connect individually or together to an electronic device 11, and can display information from the electronic device on Braille cells 12. When connected together through connection device 36, Braille display system 30 includes 40 Braille cells, and modular portions 32, 34 could cooperate in a master/slave hierarchy. When separated, each of modular portions 32, 34 include 20. Braille cells 12.

By forming Braille display system 30 with a plurality of modular portions, Braille display system 30 can be flexible to display different numbers of Braille cells 12 depending on the situation. For example, modular portions 32, 34 could be connected for desktop use at work with 40 Braille cells 12, and then when travelling, one of modular portions 32, 34 could be disconnected and taken to another location to have a Braille display system that is easier for transporting and smaller for portable use with only 20 Braille cells 12. By having modular portions 32, 34, the need to own multiple Braille display systems with different numbers of Braille cells for use in different situations is eliminated.

Figure 3:
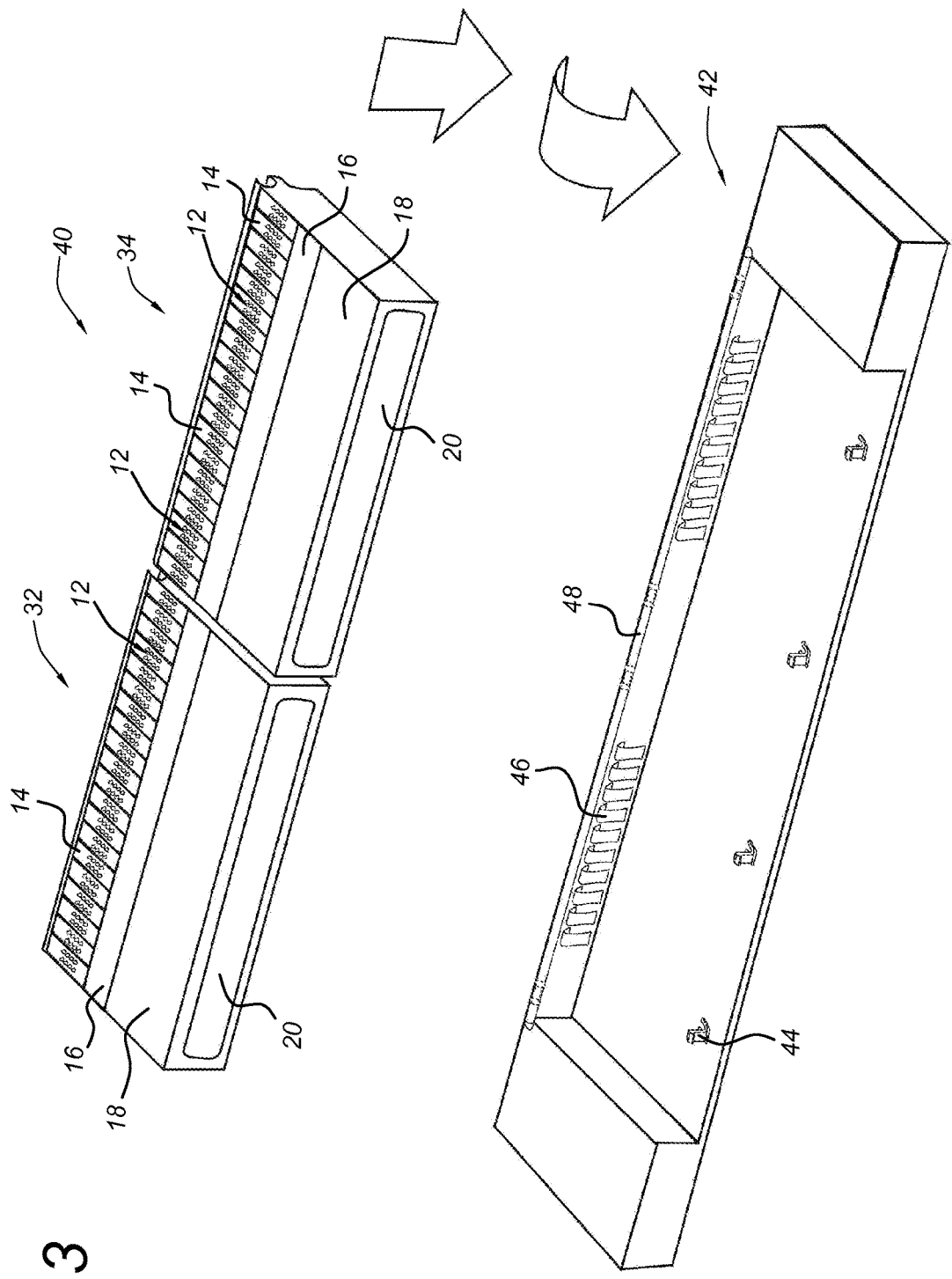
FIG. 3 shows a perspective view of a modular Braille display system with a docking station.

FIG. 3 shows a perspective view of a modular Braille display system 40 with a docking station 42. Similar parts are labeled similarly to those in FIGS. 1a-2. Braille display system 40 includes first modular portion 32, second modular portion 34 and docking device 42. Each of first modular portion 32 and second modular portion 34 includes Braille cells 12 with Braille cell caps 14, cursor routing touchstrip 16, touch panel 18 and a touch thumb panel 20. Docking station 42 includes snapfit devices 44, battery contacts 46 and magnet 48.

First modular portion 32 and second modular portion 34 can be connected through a connection device as shown in FIG. 2, through another type of connection device such as a clipping connection, through a wireless connection or through docking station. First modular portion 32 and second modular portion 34 can also include guiding means to guide in aligning modular portions 32, 34. This could be, for example, one or more magnets, alignment pins, guiding rails and/or other guiding geometry.

As can be seen, docking station 42 acts as a mount and can be a charging station for modular portions 32, 34, and includes connections for securing modular portions 32, 34 to docking station 42. In this embodiment, modular portions 32, 34 are secured through snapfit devices 44 and a magnetic connection which acts as guiding means. Magnet 48 on docking station 42 is attracted to one or more magnets (not shown) on modular portions 32, 34, providing a guiding and connecting force to align the modular portions 32, 34 with docking station 42 to ensure that modular portions 32, 34 stay properly mounted on docking station 42. Snapfit connections 44 and magnetic connection also ensure proper placement of modular portions 32, 34 into docking station to make sufficient contact between modular portions 32, 34 and battery contacts 46 so that modular portions 32, 34 can properly charge when mounted to docking station 42.

As with the modular Braille display system 30 shown in FIG. 2, Braille display system 40 with docking station 42 enables a user to use a plurality of modular units 32, 34 to read a larger amount of Braille cells 12 at one time or to use fewer or only one modular unit with or without docking station 42 as desired. In addition, docking station 42 can provide additional stability when using a plurality of modular units 32, 34 and can recharge batteries in modular units 32, 34, making modular units 32, 34 ready for portable use.

Figure 4A:
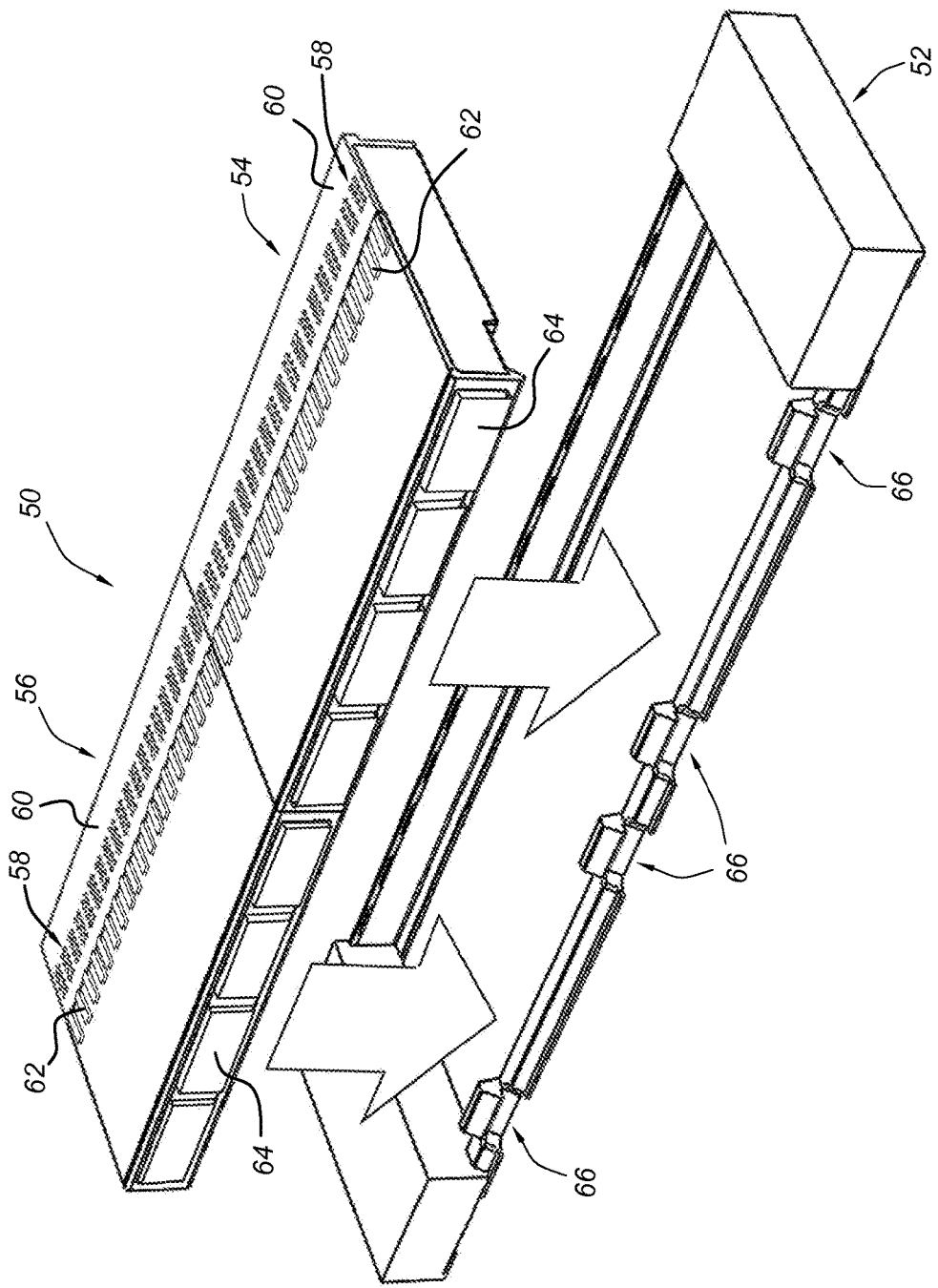
FIG. 4a shows a perspective view of a second embodiment of a modular Braille display system with a docking station.
Figure 4B:
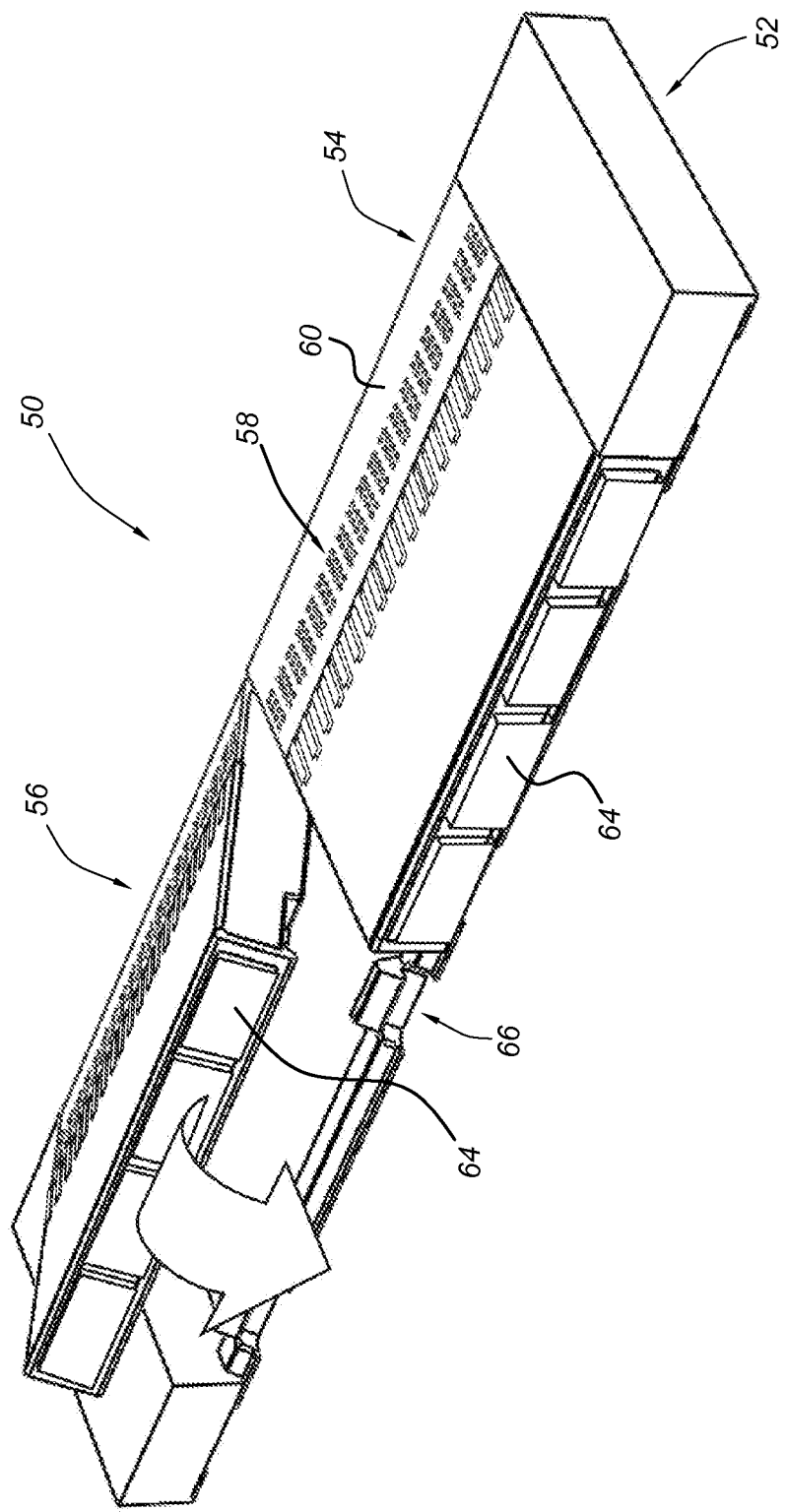
FIG. 4b shows a perspective view of the modular Braille display system of FIG. 4a, with one module secured to the docking station and one module in the process of being secured to the docking station.

FIG. 4a shows a perspective view of a second embodiment of a modular Braille display system 50 with a docking station 52, and FIG. 4b shows a perspective view of Braille display system 50, with one module 54 secured to docking station 52 and one module 56 in the process of being secured to the docking station 52.

Modular Braille display system 50 includes docking station 52, first module 54 and second module 56. Each of first module 54 and second module 56 include Braille cells 58, Braille cell cover plate 60 and cursor routing keys 62 and navigation keys 64. Docking station 52 includes hooks 66 and is shape to align with modules 54, 56 to receive modules 52, 54 and provide a secure base. While two modules 54, 56 are shown, in other embodiments, docking station 52 can be sized to receive only one module or more than two modules.

As in FIGS. 1*a*-3, modules 54, 56 can connect to an electronic device 11 (not shown) to display Braille characters from text on electronic device 11. Modules 54, 56 can be connected to each other through a connection device and/or can connect through docking station 52. Docking station 52 can also include connections to charge modules 54, 56. Each module 54, 56 is shaped to align with docking station 52. In the embodiment shown in FIGS. 4*a*-4*b*, the geometry of the lower part of modules 54, 56 matches up with the geometry of the receiving portion of docking station 52, and hooks 66 secure modules 54, 56 to docking station 52. In other embodiments, docking station 52 and/or modules 54, 56 could have different and/or additional aligning and/or securing features, for example, different geometry or features, one or more magnets, pins, snaps and/or latches.

Braille display system 50 works in much of the same manner as those of FIGS. 1*a*-3, with Braille characters being able to be displayed by Braille cells 58. However, in Braille display system 50, navigation keys 64 and/or cursor routing keys 62 are used to change the which portion of electronic device 11 is displayed by Braille cells 58. This can be in addition to or in alternative to one or more touch panels.

By connecting one or more modules 54, 56 to docking station 52, Braille display system 50 provides a reliable and secure support for the charging and/or use of one or more modules. Docking station 52 provides a stable base with which, in some cases, modules 54, 56 could be secured or locked to for addition protection, stability and/or support.

In summary, Braille display system allows for a more flexible, more ergonomic and stable system than past Braille displays. By replacing navigation keys with one or more touch panels, Braille display system can be smaller, more flexible, more ergonomic and a quieter Braille display system than past Braille display systems. Touch panels allow the flexibility of not requiring separate physical space for fixed keys for every button, and instead allow different touch inputs or gestures that can be input anywhere on the touch panel as desired. This makes for a more efficient and less distracting system as there is not a need for the user to be constantly moving his or her hands to locate and press buttons for navigating and/or typing. Additionally, the touch panel allows for a quieter system without buttons and for a system that can be adapted to each specific user's hands when typing. These allow for a smaller system that is easy to transport when needed. Modular and/or docking systems allow for a user to easily adapt a smaller, transportable Braille display systems into a larger Braille display system, which is desirable when reading a large amount of text. Docking system also provides for a secure support for any type of Braille display, making system more stable and allowing for the possibility of a locking or secure connection to keep one or more modules in place while charging and/or in use.

While FIGS. 2-4*b* show Braille display systems 30, 40 comprised of two modular portions, other embodiments could include fewer or more modular portions and/or different connection and/or docking devices. In other embodiments, the Braille display system could be non-modular, and comprised of one or more units. While each of FIGS. 1*a*-4*b* show a Braille display system 10 with 40 Braille cells, more or fewer Braille cells can be used in such a system. For example, the number of Braille cells could be from 10 to 30 cells, from 30 to 50 cells, from 50 to 100 cells or more.

While two touch thumb panels 20 are shown, touch thumb panel 20 can be just one panel or could be more than two panels. While the Braille display systems 10, 30, 40 shown include a plurality of Braille cell caps 14, in other embodiments, display systems 10, 30, 40 could have a single Braille cell cap covering all the Braille cells 12 and/or a top plate covering Braille cells 12, as in FIGS. 4*a*-4*b*. Similarly, the embodiment shown in FIGS. 4*a*-4*b* could include a plurality of Braille cell caps instead of the cover plate 60 shown.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A Braille display system comprising:
   a first modular portion; and
   a second modular portion,
   wherein the first modular portion and the second modular portion may be connected for use together or separated for use as only a single modular portion, and each of the first module portion and the second modular portion comprise:
   a housing comprising:
      a display portion comprising a plurality of dynamically changing Braille cells, each Braille cell at a set position in the housing;
      an input portion comprising a touch sensitive surface able to receive hand input gestures or commands and adjacent to the display portion such that a user can input the gestures or commands directly adjacent to any Braille cell;
      a cursor routing touch strip; and
      a touch thumb panel.

2. The system of claim 1, wherein the touch sensitive surface is a touch panel.

3. The system of claim 2, wherein the touch sensitive surface is a multi-touch touch panel.

4. The system of claim 2, wherein the touch panel is paired with a processor, and the touch panel/processor pair is programmed for input finger detection.

5. The system of claim 4, wherein the touch panel/processor pair is programmed for receiving hand gesture input.

6. The system of claim 1, wherein the touch sensitive surface serves as a Braille keyboard which can be calibrated and/or recalibrated according to a user's current finger position.

7. The system of claim 6, wherein the Braille keyboard is a 6-dot Braille keyboard.

8. The system of claim 6, wherein the Braille keyboard is an 8-dot Braille keyboard.

9. The system of claim 1, wherein the integrated Braille display system comprises a top surface with a proximal user portion and a distal user portion, and wherein the Braille cells are substantially located in the distal user portion.

10. The system of claim 9, wherein the touch sensitive surface is substantially located in the proximal user portion.

11. The system of claim 1, and further comprising:
  at least one touch thumb panel located on a front surface of the integrated Braille display system.

12. The system of claim 1, wherein the plurality of Braille cells comprises from 10 to 30, from 30 to 50, or from 50 to 100, Braille cells.

13. The system of claim 1, wherein the first modular portion and the second modular portion may be connected wirelessly to communicate with each other.

14. The system of claim 1, wherein the first modular portion and the second modular portion may be connected by establishing an electrical connection between the modular portions.

15. The system of claim 14, wherein the electrical connection is established by connecting the first modular portion and the second modular portion to a docking station.

16. The system of claim 15, and further comprising guiding means to guide aligning of the first modular portion and/or the second modular portion with the docking station.

17. The system of claim 16, wherein the guiding means is one or more magnets.

18. The system of claim 1, wherein the first modular portion and the second modular portion may be clipped together.

19. The system of claim 1, further comprising guiding means to guide aligning of the first modular portion with the second modular portion.

20. The system of claim 19, wherein the guiding means is one or more magnets.

21. The system of claim 1, wherein the first modular portion and the second modular portion cooperate in a master/slave hierarchy.

22. A Braille display system, the system comprising:
  first module with a plurality of Braille cells at a set position in the first module, the plurality of Braille cells for displaying information from the system, the first module further comprising at least one touch sensitive surface adjacent to the plurality of Braille cells, a cursor routing touch strip; and a touch thumb panel, the at least one touch sensitive surface calibrated to operate as a Braille keyboard at any position to provide input into the system according to the user's current finger position along the plurality of Braille cells and/or along the touch sensitive surface, and
  a second module with a plurality of Braille cells, a touch sensitive surface to be used as a Braille keyboard and connectable to the first module to be used with the first module, a cursor routing touch strip, and a touch thumb panel.

23. The Braille display system of claim 22, and further comprising a docking station, wherein the docking station comprises:
  guiding means to guide aligning of the at least one of the first module and the second module with a docking station.

24. The Braille display system of claim 23, wherein the guiding means secures at least one of the first module and the second module to the docking station.

25. The Braille display system of claim 23, and further comprising:
  locking means to secure at least one of the first module and the second module to the docking station.

26. The Braille display system of claim 23, wherein an electrical connection is established by connecting at least one of the first module and the second module with the docking station.

27. The Braille display system of claim 23, wherein the docking station provides power to at least one of the first module and the second module.

* * * * *